April 1, 1969 K. E. STOBER 3,436,326
REMOVAL OF WASTE SOLIDS FROM AQUEOUS SYSTEMS
Filed Dec. 28, 1964
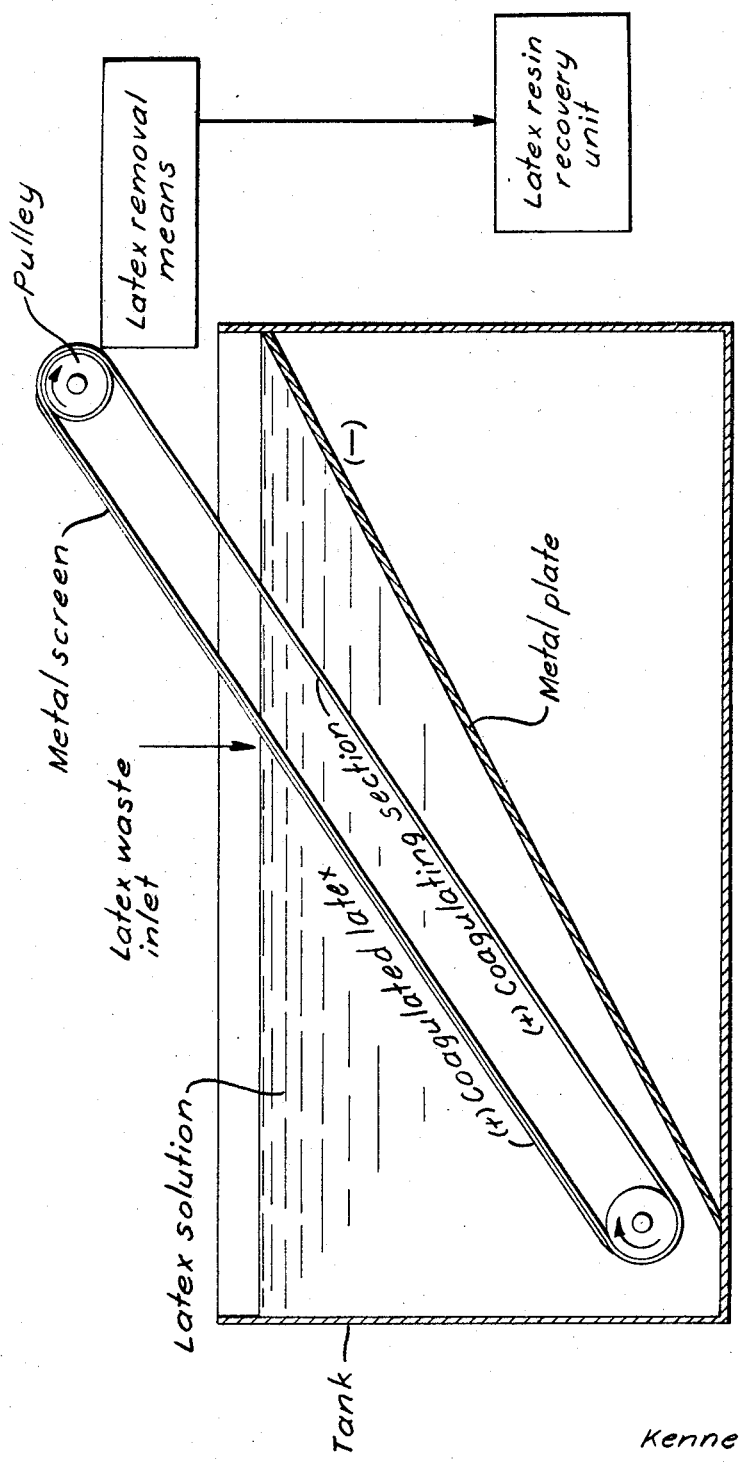
INVENTOR.
Kenneth E. Stober
BY Burton Rodney
ATTORNEY United States Patent Office 3,436,326
Patented Apr. 1, 1969

3,436,326
REMOVAL OF WASTE SOLIDS FROM
AQUEOUS SYSTEMS
Kenneth E. Stober, Gales Ferry, Conn., assignor to The
Dow Chemical Company, Midland, Mich., a corporation of Delaware
Filed Dec. 28, 1964, Ser. No. 421,320
Int. Cl. C23b 13/00; B01k 5/00; B01d 13/02
U.S. Cl. 204—180                                5 Claims

ABSTRACT OF THE DISCLOSURE

An electrically charged, continuous belt-like metallic screen is run through an aqueous waste with the screen electrophoretically picking up the latex solids. Then the solids are removed before the screen re-enters the waste.

---

This invention relates to the removal of waste solids from aqueous systems and more particularly is concerned with the removal of latex solids from aqueous systems by electrolytically treating said system.

The term "aqueous system" as used herein includes solutions, dispersions, emulsions, colloidal suspensions and the like.

The removal of latex wastes from aqueous wastes has long been a problem with inadequate resolution. Until now, latex waste solids in quantities of from about 0.1 to about 5 weight percent solids have been removed from aqueous systems by treating said system with alum, caustic, and preflocculating agents. In conventional operations, the resulting mixture is agitated and then allowed to coagulate. The separation of the coagulated solids from the clear water is then carried out by any of several mechanical methods including filtering or screening, decanting of clear water, skimming off floating solids and decanting, settling and decanting, and centrifuging and decanting.

The aforedescribed method of latex waste removal from aqueous systems has the following disadvantages:

(1) The use of chemicals such as alum, caustic and preflocculating agents is expensive.

(2) The use of the above mentioned chemicals requires employment of special equipment to accurately maintain the proper concentration of said chemicals in the latex waste water stream.

(3) Separation of solids from clear water by screening has proven inadequate due to the constant plugging of the screens. Further, settling basins, centrifuges and other separation equipment are bulky and expensive.

It is a principal object of the instant invention to provide an efficient method for removing latex waste solids from aqueous systems.

A further object is to provide a method for removing latex waste solids from aqueous systems which is inexpensive to carry out and which employs no bulky and/or costly equipment.

Other objects and advantages of the instant invention will become apparent from reading the detailed description thereof set forth hereinafter.

The accompanying figure illustrates one embodiment of the instant invention.

In general, the instant invention is a method of removing latex solids from aqueous electrolyte systems which comprises providing an aqueous system containing from about 0.001 to about 5.0 percent by weight latex solids and an electrolyte, such as an electrolytic salt or salts in an amount of from about .005 to about 0.05 weight percent of the system; immersing at least one pair of electrodes, into said system; passing a direct current through said system to provide a positive electrical charge on one electrode of each pair and a negative electrical charge on the other electrode of each pair thereby causing substantially all of said latex to migrate to and electro-plate out on the positively charged electrode; and then removing said latex from said electrode. In the event that the aqueous system itself does not contain sufficient electrolytic salts to give the minimum current necessary to promote the coagulation of the latex, electrolytic salts are added to the aqueous system in an amount to provide a total electrolyte of from about 0.005 to about 0.05 weight percent of the system.

In carrying out one embodiment of the instant method a metal screen, such as, for example, one of aluminum, stainless steel, ordinary carbon steel and the like is submerged in a latex containing-aqueous electrolyte system to serve as the positive electrode or anode. Another metal screen or a metal plate, which serves as the cathode, is inserted in the aqueous ssytem and is spaced apart from the first screen. A power supply is attached to the so-positioned electrodes. A direct current is passed through the aqueous system whereupon the latex coagulates and electro-plates onto the positively charged metal screen. Ordinarily, at intervals, this screen is then removed from the system and cleaned. A prime advantage of this embodiment is that the wire mesh of the screen holds the latex deposited around the wires thereby preventing its falling back into the aqueous electrolyte upon removal of the screen from the system.

In a preferred embodiment as shown in the schematic drawing the metal screen can be formed into a continuous belt riding over spaced apart rollers or carried on a roller chain and sprockets and driven by a power source. Such a belt, having been positively charged, can be passed through a latex-containing aqueous system thereby removing latex solids which electro-plate out thereon. The so-plated polymers can be removed from one portion of the belt (preferably out of contact with the aqueous system) while additional polymer is plating out on another portion of the belt. In addition, if desired, the latex can be permitted to completely coat the screen by the electroplating action. This offers an additional advantage in that as the so-coated belt is passed through the aqueous system prior to removal of the latex coating therefrom, additional solid latex in the aqueous system which has already been coagulated by the electric current will adhere to the latex layer already present on the moving belt. In this manner an additional amount of coagulated solids can be physically removed from the system prior to cleaning of the screen.

It is more advantageous to use screens as the electrodes than a solid sheet or plate-like electrode. When using a solid sheet or plate, the polymer which collected on the positive terminal does not adhere as tightly to the plate as it does a screen. Thus when the solid metal plate electrode is removed from the aqueous system, the latex accumulated thereon tends to slide off back into the aqueous system. In addition, a screen has the advantage of being easier to clean than a metal plate. An air blast, scrubber and other suitable means can easily remove the polymer from the screen prior to reimmersion into the system.

The actual arrangement and position of the plates or screens in the aqueous position to achieve the most efficient latex removal is dependent on the concentration of latex in the organic system, the size of the aqueous system, the type of electrodes used and the amount of current used. This readily can be determined for a given system of operation by one skilled in the art.

Materials which can be used as electrodes herein include, for example, solid plates of aluminum, stainless steel, steel, tin, copper, nickel, and brass; and screens of aluminum, stainless steel, steel, tin, copper, nickel and brass, and combinations of said plates and screens.

Electrolytic salts which are suitable for use as additiments in those systems which do not contain the requisite amount of electrolyte for operability of the instant method include, but are not limited to, sodium chloride, sodium sulfate, calcium chloride, potassium chloride, and the like.

The following example is further illustrative of the instant invention but in no way is meant to limit it thereto.

EXAMPLE

Into a 400 milliliter (ml.) beaker was introduced about 350 ml. of an aqueous solution containing about 5 percent by weight latex solids and about 0.01 weight percent sodium chloride. Two stainless steel, 100 mesh U.S. Standard Sieve screens, 2 inches long and 1¼ inches wide, were positioned in the beaker so as to be about ¾ inch apart. About 1⅞ square inches of each screen were exposed to the liquid latex solution. A positive charge from a 12 volt D.C. battery charger was placed on one screen.

Within about 5 minutes after the current was turned on, a latex deposit of about 3/16 to about ¼ inch thickness had plated onto the inside surface of the positively charged screen. When the screens were removed from the beaker, the negatively charged screen was clean while the latex deposit clung to the positively charged screen. This resin cake on the positive screen was easily removed by tapping the screen lightly. The screen was then placed back in the beaker and the latex precipitating operation on said screen was repeated.

The instant procedure was repeated using direct current at a potential of 6 volts. The deposit of latex on the positively charged screen was about ½ that produced at 12 volts for the same period of exposure.

Various modifications can be made in the method of the instant invention without departing from the spirit or scope thereof, for it is to be understood that I limit myself only as defined in the appended claims.

What I claim is:
1. A waste treatment method which comprises:
 (a) providing an aqueous waste containing from about 0.001 to about 5 percent by weight latex solids and at least one electrolytic salt in an amount from about .005 to about .05 weight percent of the waste;
 (b) immersing at least one pair of electrodes into said aqueous waste;
 (c) passing a direct current through said aqueous waste thereby providing a positive charge on one electrode and a negative charge on the other electrode, said latex migrating to and plating out on the positively charge electrode;
 (d) separating said latex coated electrode from said aqueous waste; and
 (e) removing said latex from said positive electrode.

2. The method in accordance with claim 1, wherein each of said electrodes is comprised of a metallic screen.

3. The method in accordance with claim 1, wherein each of said electrodes is comprised of a metallic solid plate.

4. A continuous waste treatment method which comprises:
 (a) providing an aqueous waste containing from about 0.001 to about 5 percent by weight latex solids and at least one electrolyte salt in an amount from about 0.005 to about .05 weight percent of the waste;
 (b) immersing into said aqueous waste at least one pair of metallic screen electrodes;
 (c) passing a direct current through said aqueous waste thereby providing a positive charge on one electrode of each electrode pair and a negative charge on the other electrode of each electrode pair;
 (d) continuously moving the positively charged electrode through the aqueous waste, said latex migrating to and plating out on said moving positively charged electrode;
 (e) separating said latex coated electrode from said aqueous waste; and
 (f) removing said latex from said positive electrode.

5. The method in accordance with claim 4, wherein said positive electrode is a continuous belt riding over spaced apart rollers.

References Cited

UNITED STATES PATENTS

| | | | |
|---|---|---|---|
| 993,888 | 5/1911 | Schwerin | 204—180 |
| 1,589,325 | 6/1926 | Sheppard et al. | 204—300 X |
| 1,702,705 | 2/1929 | Porter | 204—300 X |
| 1,750,177 | 3/1930 | Klein | 204—300 X |
| 2,302,386 | 11/1942 | Fisher | 204—184 |
| 2,485,335 | 10/1949 | Tyson | 204—180 |

ROBERT K. MICHALEK, *Primary Examiner.*

A. C. PRESCOTT, *Assistant Examiner.*

U.S. Cl. X.R.

204—181